US009963182B2

(12) United States Patent
Oguchi

(10) Patent No.: US 9,963,182 B2
(45) Date of Patent: May 8, 2018

(54) HEADLIGHT FOR TWO-WHEELED MOTOR VEHICLE

(71) Applicant: HONDA MOTOR CO., LTD., Minato-ku, Tokyo (JP)

(72) Inventor: Tsuyoshi Oguchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 178 days.

(21) Appl. No.: 14/779,932

(22) PCT Filed: Mar. 26, 2014

(86) PCT No.: PCT/JP2014/058571
§ 371 (c)(1),
(2) Date: Sep. 24, 2015

(87) PCT Pub. No.: WO2014/157353
PCT Pub. Date: Oct. 2, 2014

(65) Prior Publication Data
US 2016/0046340 A1   Feb. 18, 2016

(30) Foreign Application Priority Data

Mar. 28, 2013   (JP) .................................. 2013-070174

(51) Int. Cl.
*B62J 6/02* (2006.01)
*B62J 99/00* (2009.01)

(52) U.S. Cl.
CPC .............. *B62J 6/02* (2013.01); *F21S 41/147* (2018.01); *F21S 41/24* (2018.01); *F21S 41/29* (2018.01);
(Continued)

(58) Field of Classification Search
CPC .. B62J 6/02; F21S 41/24; F21S 41/147; F21S 41/336; F21S 41/29; F21S 41/39;
(Continued)

(56) References Cited

U.S. PATENT DOCUMENTS 6,390,656 B1 *   5/2002   Suda .................... B60Q 1/0041
                                                         362/473
8,936,383 B2      1/2015   Sumi et al.
(Continued)

FOREIGN PATENT DOCUMENTS

CN       102490824 A     6/2012
EP         2568321 A2    3/2013
(Continued)

OTHER PUBLICATIONS

Official Communication dated May 2, 2017 issued over the corresponding Chinese Patent Application 201480018184.2.
(Continued)

*Primary Examiner* — Anh Mai
*Assistant Examiner* — Nathaniel Lee
(74) *Attorney, Agent, or Firm* — Carrier Blackman & Associates, P.C.; Joseph P. Carrier; Anne G. Sabourin

(57) ABSTRACT

A headlight for a two-wheeled motor vehicle is provided in which disposed in a single housing are a high beam headlamp light source, low beam headlamp light sources that are disposed on the left and right of the high beam headlamp light source, a high beam headlamp reflector, low beam headlamp reflectors that are disposed on left and right sides of the high beam headlamp reflector and are formed integrally with the high beam headlamp reflector, and a position lamp light source, wherein a light guide member that guides light from the position lamp light source and makes the light shine forward is extendingly disposed so as to surround a lateral end, excluding a section adjacent to the high beam headlamp reflector, of the low beam headlamp reflector. This enables visibility and conspicuousness to be improved.

10 Claims, 6 Drawing Sheets

(52) U.S. Cl.
CPC .............. *F21S 41/336* (2018.01); *F21S 41/39* (2018.01); *F21S 43/14* (2018.01); *F21S 43/237* (2018.01); *F21S 43/241* (2018.01); *F21S 43/245* (2018.01); *B62J 2099/0033* (2013.01); *F21W 2107/17* (2018.01)

(58) Field of Classification Search
CPC ........ F21S 43/237; F21S 43/14; F21S 43/245; F21S 43/241
See application file for complete search history.

(56) References Cited

U.S. PATENT DOCUMENTS

| | | | |
|---|---|---|---|
| 9,080,737 B2 | 7/2015 | Monma et al. | |
| 2007/0047249 A1* | 3/2007 | Kogo | B60Q 1/0011 362/538 |
| 2007/0236930 A1 | 10/2007 | Koizumi et al. | |
| 2011/0149587 A1* | 6/2011 | Hayashi | B60Q 1/0041 362/520 |
| 2011/0194301 A1* | 8/2011 | Schneider | B60Q 1/0041 362/511 |
| 2012/0069592 A1 | 3/2012 | Natsume et al. | |
| 2013/0039085 A1* | 2/2013 | Iwasaki | F21S 48/1159 362/516 |
| 2013/0044503 A1* | 2/2013 | Mihara | F21S 48/1241 362/511 |
| 2013/0063966 A1* | 3/2013 | Sumi | B60Q 1/0047 362/602 |

FOREIGN PATENT DOCUMENTS

| | | |
|---|---|---|
| JP | S57-53362 Y2 | 11/1982 |
| JP | 6-56912 U | 8/1994 |
| JP | 2001-067906 A | 3/2001 |
| JP | 2004-227981 A | 8/2004 |
| JP | 2007-062565 A | 3/2007 |
| JP | 2007-280880 A | 10/2007 |
| JP | 2008-001305 A | 1/2008 |
| JP | 2008-021419 A | 1/2008 |
| JP | 2009-234479 A | 10/2009 |
| JP | 2010-083279 A | 4/2010 |
| JP | 2010-083729 A | 4/2010 |
| JP | 2011-081975 A | 4/2011 |
| JP | 2012-064500 A | 3/2012 |
| JP | 2012-146584 A | 8/2012 |
| JP | 2012-201127 A | 10/2012 |
| JP | 2014-007106 A | 1/2014 |
| WO | 2012/120947 A1 | 9/2012 |

OTHER PUBLICATIONS

Official Communications dated Dec. 5, 2016 to corresponding European Patent Application No. 14 774 039.3.
Official Communication issued in the corresponding divisional Japanese Patent Application 2016-221805, dated Aug. 23, 2017.

* cited by examiner

HEADLIGHT FOR TWO-WHEELED MOTOR VEHICLE

TECHNICAL FIELD

The present invention relates to a headlight for a two-wheeled motor vehicle in which disposed in a single housing supported on a front part of a vehicle body frame are a high beam headlamp light source, low beam headlamp light sources that are disposed on left and right of the high beam headlamp light source, a high beam headlamp reflector that reflects forward light from the high beam headlamp light source, low beam headlamp reflectors that are disposed on left and right sides of the high beam headlamp reflector so as to reflect forward light from the low beam headlamp light source and that are formed integrally with the high beam headlamp reflector, and a position lamp light source.

BACKGROUND ART

A headlight for a two-wheeled motor vehicle in which disposed within a single housing are light sources for low beam headlamps disposed on the left and right of a light source for a high beam headlamp is known from Patent Document 1.

RELATED ART DOCUMENTS

Patent Documents

Patent Document 1: Japanese Patent Application Laid-open No. 2001-067906

SUMMARY OF THE INVENTION

Problems to be Solved by the Invention

Such a headlight has a bilaterally symmetric illumination pattern and therefore is good in terms of both visibility and conspicuousness, but there is a desire for further improvement of the visibility and conspicuousness.

The present invention has been accomplished in light of such circumstances, and it is an object thereof to provide a headlight for a two-wheeled motor vehicle having improved visibility and conspicuousness.

Means for Solving the Problems

In order to attain the above object, according to a first aspect of the present invention, there is provided a headlight for a two-wheeled motor vehicle in which disposed in a single housing supported on a front part of a vehicle body frame are a high beam headlamp light source, low beam headlamp light sources that are disposed on left and right of the high beam headlamp light source, a high beam headlamp reflector that reflects forward light from the high beam headlamp light source, low beam headlamp reflectors that are disposed on left and right sides of the high beam headlamp reflector so as to reflect forward light from the low beam headlamp light source and that are formed integrally with the high beam headlamp reflector, and a position lamp light source, characterized in that a light guide member that guides light from the position lamp light source and makes the light shine forward is extendingly disposed so as to surround a lateral end, excluding a section adjacent to the high beam headlamp reflector), of the low beam headlamp reflector.

Further, according to a second aspect of the present invention, in addition to the first aspect, the high beam headlamp reflector and the low beam headlamp reflector are each formed from a flat-shaped upper reflector and a lower reflector that has a substantially arc shaped form so as to reflect forward light from above, and the upper reflectors of the high beam headlamp reflector and the low beam headlamp reflector are provided with a through hole that makes light from the high beam headlamp light source and the low beam headlamp light source disposed above the upper reflectors shine toward the lower reflectors of the high beam headlamp reflector and the low beam headlamp reflector.

According to a third aspect of the present invention, in addition to the first or second aspect, the light guide member, while having a linear part extending obliquely upward and toward the outside in a vehicle width direction above the left and right low beam headlamp reflectors and a curved part extending downward from an upper end of the linear part and having a lower part formed so as to follow the outside of the low beam headlamp reflector, is formed so that a section where the linear part and the curved part are connected is formed so as to form a sharp corner part that points upward and toward the outside in the vehicle width direction.

According to a fourth aspect of the present invention, in addition to any one of the first to third aspects, disposed in the housing are a pair of left and right direction indicator light sources disposed on the outside in a left-and-right direction of the pair of left and right low beam headlamp light sources and the light guide member.

According to a fifth aspect of the present invention, in addition to the fourth aspect, the light guide member is formed so as to cross between the low beam headlamp light source and the direction indicator light source.

According to a sixth aspect of the present invention, in addition to any one of the first to fifth aspects, a cover member is disposed in front of the high beam headlamp reflector and the low beam headlamp reflector and is mounted on the housing, the cover member having a reflection portion that makes part of the light reflected from the high beam headlamp reflector and the low beam headlamp reflector shine forward of the vehicle.

According to a seventh aspect of the present invention, in addition to any one of the first to sixth aspects, the light guide member is disposed further forward than the position lamp light source.

Moreover, according to an eighth aspect of the present invention, in addition to any one of the first to seventh aspects, part of the light guide member is formed so as to follow the low beam headlamp reflector.

Effects of the Invention

In accordance with the first aspect of the present invention, since light from the position lamp light source is made to shine forward from the light guide member surrounding the lateral end, excluding a section adjacent to the high beam headlamp reflector, of the low beam headlamp reflector, it is possible to integrate the light of the low beam headlamp and the light of the position lamp and make it shine forward, thus enabling the visibility to be enhanced and also enabling an oncoming vehicle to recognize the outer frame part of the headlight and thereby enable the conspicuousness to be enhanced.

In accordance with the second aspect of the present invention, with regard to the high beam headlamp reflector and the low beam headlamp reflector, light from the high beam headlamp light source and the low beam headlamp light source is made to shine toward the substantially arc-shaped lower reflector via the through hole provided in the flat-shaped upper reflector, light reflected by the lower reflector is made to shine forward, and it is therefore possible to make it shine forward compactly and effectively.

In accordance with the third aspect of the present invention, since the light guide member is formed so as to have the linear part and the curved part extending downward from the upper end of the linear part while forming, between itself and the linear part, the sharp corner part, which points upward and outward in the vehicle width direction, it is possible to make the left and right low beam headlamps stand out, thereby contributing to improvement of the conspicuousness of the vehicle.

In accordance with the fourth aspect of the present invention, the direction indicator light source is disposed outside in the left-and-right direction of the pair of left and right low beam headlamp light sources and light guide members, thus enabling the direction indicator to be easily differentiated from the low beam headlamp and the position lamp and thereby enhancing the visibility of each lamp.

In accordance with the fifth aspect of the present invention, since the light guide member crosses between the low beam headlamp light source and the direction indicator light source, it is possible to clearly divide the low beam headlamp and the direction indicator by means of the light guide member, thus enabling a compact and highly visible headlight to be formed.

In accordance with the sixth aspect of the present invention, since the reflecting part of the cover member disposed in front of the high beam headlamp reflector and the low beam headlamp reflector make part of the light reflected by the high beam headlamp reflector and the low beam headlamp reflector shine forward of the vehicle, it is possible to make it shine forward efficiently, thus enhancing the visibility.

In accordance with the seventh aspect of the present invention, since the light guide member is in front of the position lamp light source, it is possible to set a relatively small distance between the left and right position lamp light sources, thus enabling the headlight to be formed compactly in the left-and-right direction.

Furthermore, in accordance with the eighth aspect of the present invention, since part of the light guide member follows the low beam headlamp reflector, it is possible to make the low beam headlamp stand out by means of light from the light guide member.

EXPLANATION OF REFERENCE NUMERALS AND SYMBOLS

Figure 1:
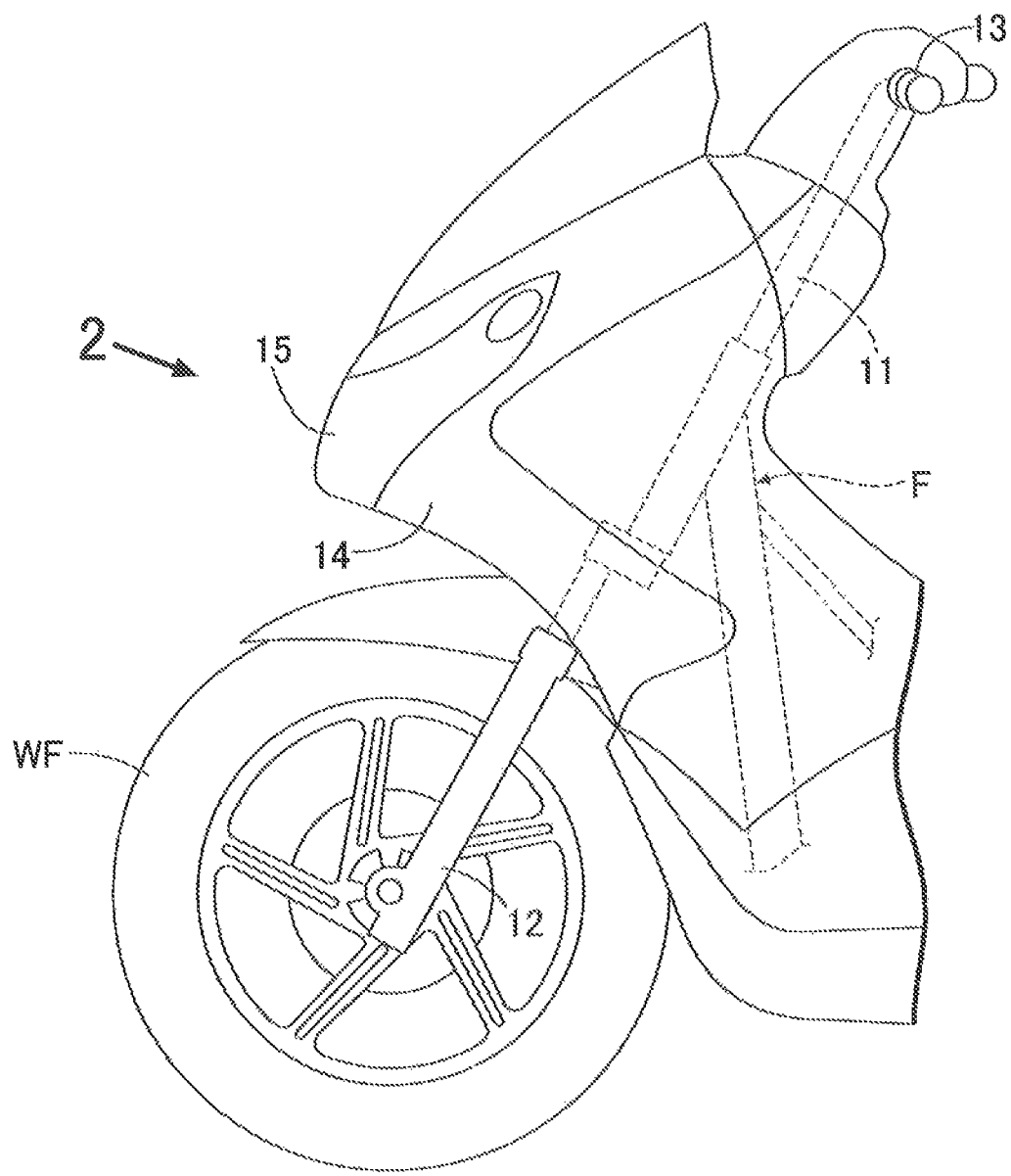
FIG. 1 is a front side view of a two-wheeled motor vehicle. (first embodiment)
Figure 2:
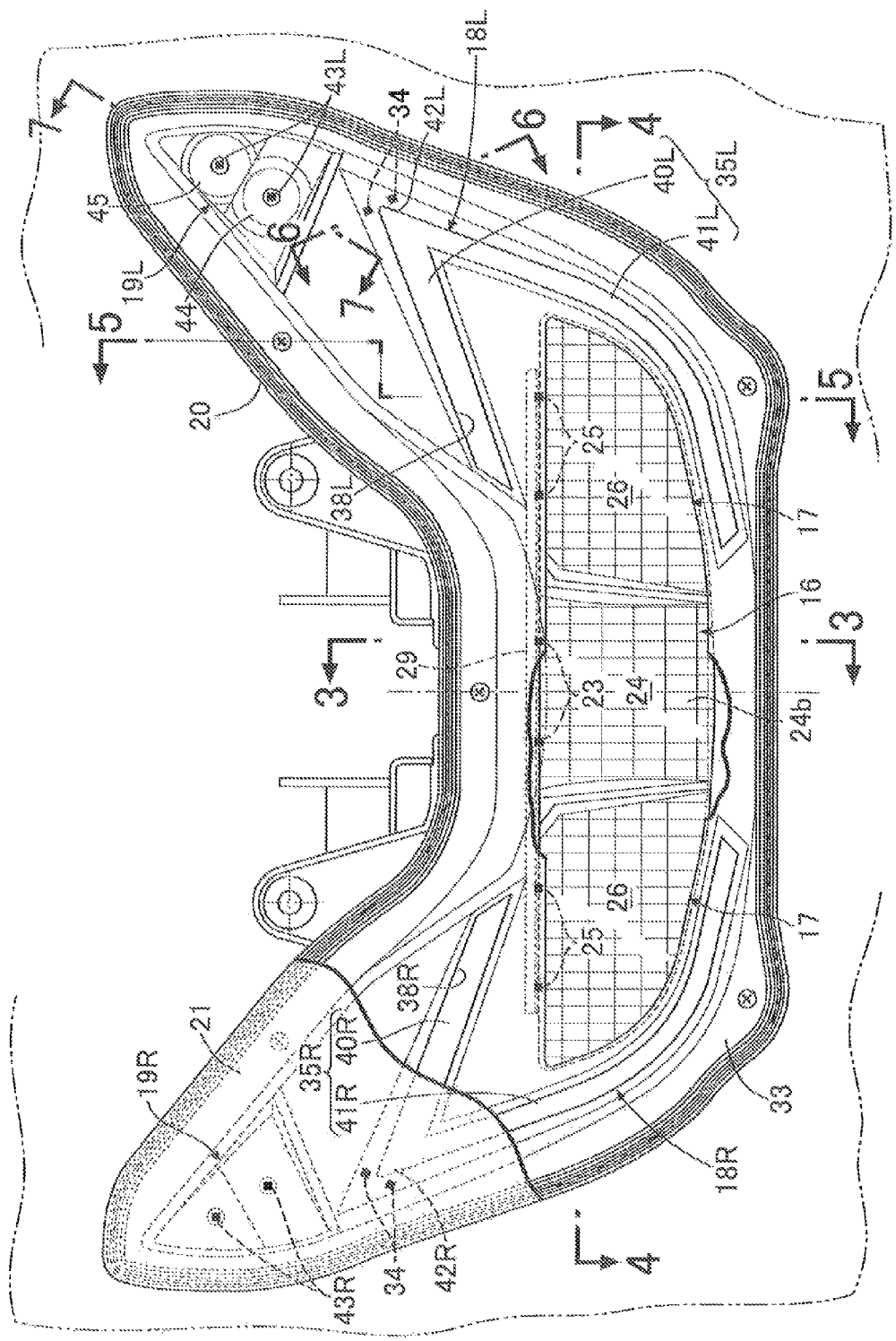
FIG. 2 is a cutout front view of part of a headlight when viewed from the direction of arrow 2 in FIG. 1. (first embodiment)

15 Headlight
20 Housing
23 High beam headlamp light source
24 High beam headlamp reflector
24a, 26a Upper reflector
24b, 26b Lower reflector
25 Low beam headlamp light source
26 Low beam headlamp reflector
27, 28 Through hole
33 Cover member
33a, 33b Reflection portion
34 Position lamp light source
35L, 35R Light guide member
40L, 40R Linear part
41L, 41R Curved part
42L, 42R Corner part
43L, 43R Direction indicator light source
F Vehicle body frame

MODE FOR CARRYING OUT THE INVENTION

An embodiment of the present invention is explained by reference to FIG. 1 to FIG. 7. In the explanation below, left-to-right is defined as the direction as viewed by a person riding a two-wheeled motor vehicle.

First Embodiment

First, in FIG. 1, steerably supported on a head pipe 11 provided at the front end of a vehicle body frame F of a two-wheeled motor vehicle are a front fork 12 axially supporting a front wheel WF and handlebars 13 linked to an upper part of the front fork 12, and a headlight 15 in accordance with the present invention is mounted on a front middle part of a front cowl 14 mounted on the vehicle body frame F so as to cover the head pipe 11 from the front.

Referring in addition to FIG. 2 to FIG. 5, the headlight 15 includes a high beam headlamp 16, low beam headlamps 17 and 17 disposed on left and right sides of the high beam headlamp 16, a pair of left and right position lamps 18L and 18R, and a pair of left and right direction indicators 19L and 19R.

The high beam headlamp 16, the low beam headlamps 17 and 17, the position lamps 18L and 18R, and the direction indicators 19L and 19R include in common a single housing 20 and a single lens 21 that is mounted on the housing 20 from the front while making part thereof face an opening 22 provided in the front cowl 14.

The high beam headlamp 16 includes the housing 20, the lens 21, a pair of high beam headlamp light sources 23 and 23 disposed in the housing 20 while being arranged side by side on a middle part in the left-and-right direction of the housing 20, and a high beam headlamp reflector 24 disposed in the housing 20 while reflecting forward light from the high beam headlamp light sources 23 and 23, the high beam light sources 23 and 23 being LEDs.

The low beam headlamp 17 includes the housing 20, the lens 21, low beam headlamp light sources 25 and 25 that are a pair of LEDs arranged side by side in the left-and-right direction and disposed in the housing 20, and a low beam headlamp reflector 26 that is disposed in the housing 20 so as to reflect forward light from the low beam headlamp light sources 25 and 25.

The pairs of low beam headlamp light sources 25 and 25; 25 and 25 possessed respectively by the pair of left and right low beam headlamps 17 and 17 are disposed on the right and left of the high beam headlamp light sources 23 and 23. Furthermore, the low beam headlamp reflectors 26 and 26 possessed by the pair of left and right low beam headlamps 17 and 17 are disposed on the left and right of the high beam headlamp reflector 24 and are formed integrally with the high beam headlamp reflector 24.

The high beam headlamp reflector 24 and the low beam headlamp reflectors 26 are each formed from flat-shaped upper reflectors 24a, 26a and lower reflectors 24b, 26b that reflect forward light from above, and the upper reflectors 24a, 26a are formed into a flat shape extending in the left-and-right direction in common for the high beam headlamp 16 and the low beam headlamps 17.

Furthermore, the upper reflectors 24a, 26a of the high beam headlamp reflector 24 and the low beam headlamp reflectors 26 are provided with through holes 27, 28 that make light from the high beam headlamp light sources 23 and the low beam headlamp light sources 25 disposed above the upper reflectors 24a, 26a shine toward the lower reflectors 24b, 26b of the high beam headlamp reflector 24 and the low beam headlamp reflectors 26.

Figure 4:
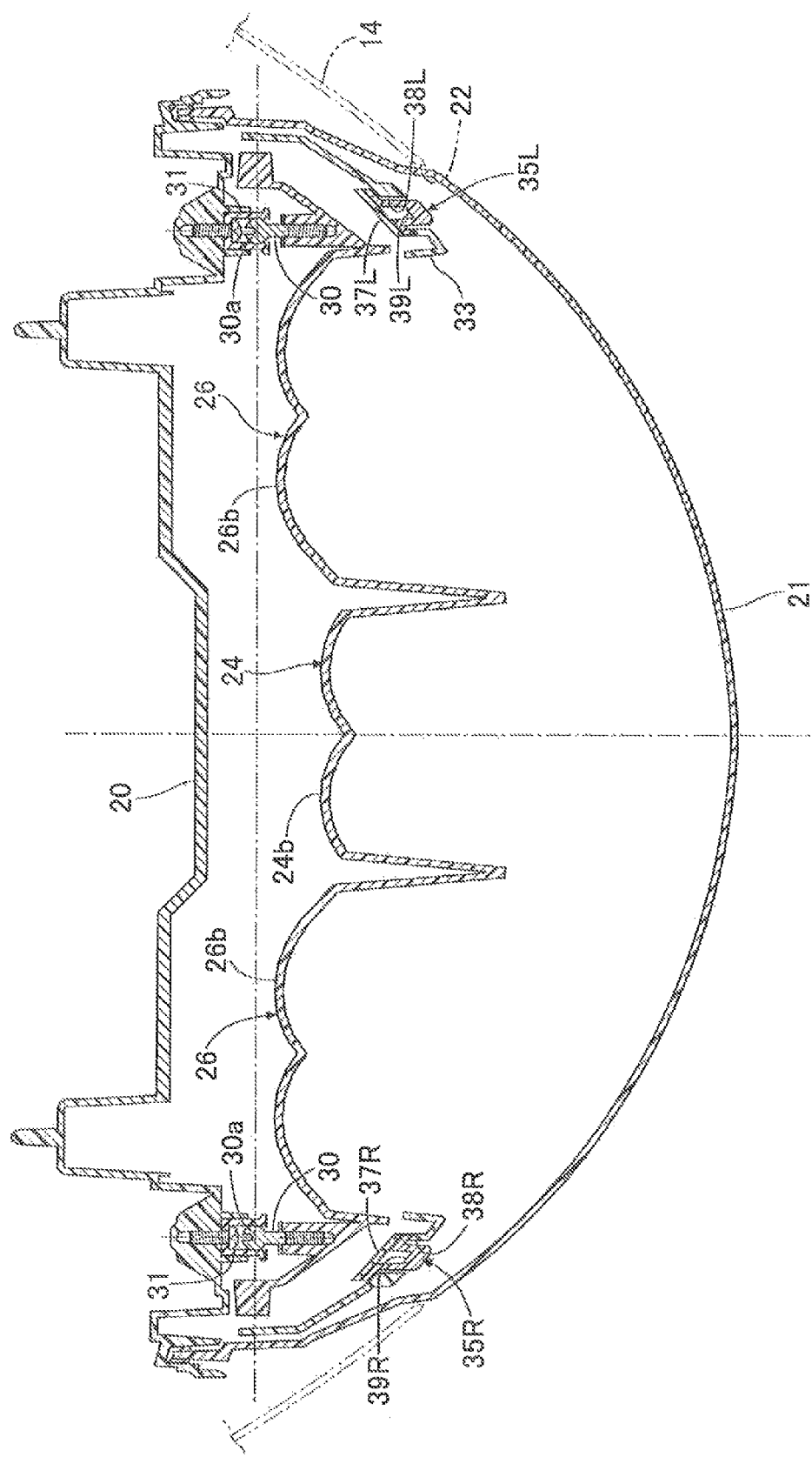
FIG. 4 is a sectional view along line 4-4 in FIG. 2. (first embodiment)
Figure 5:
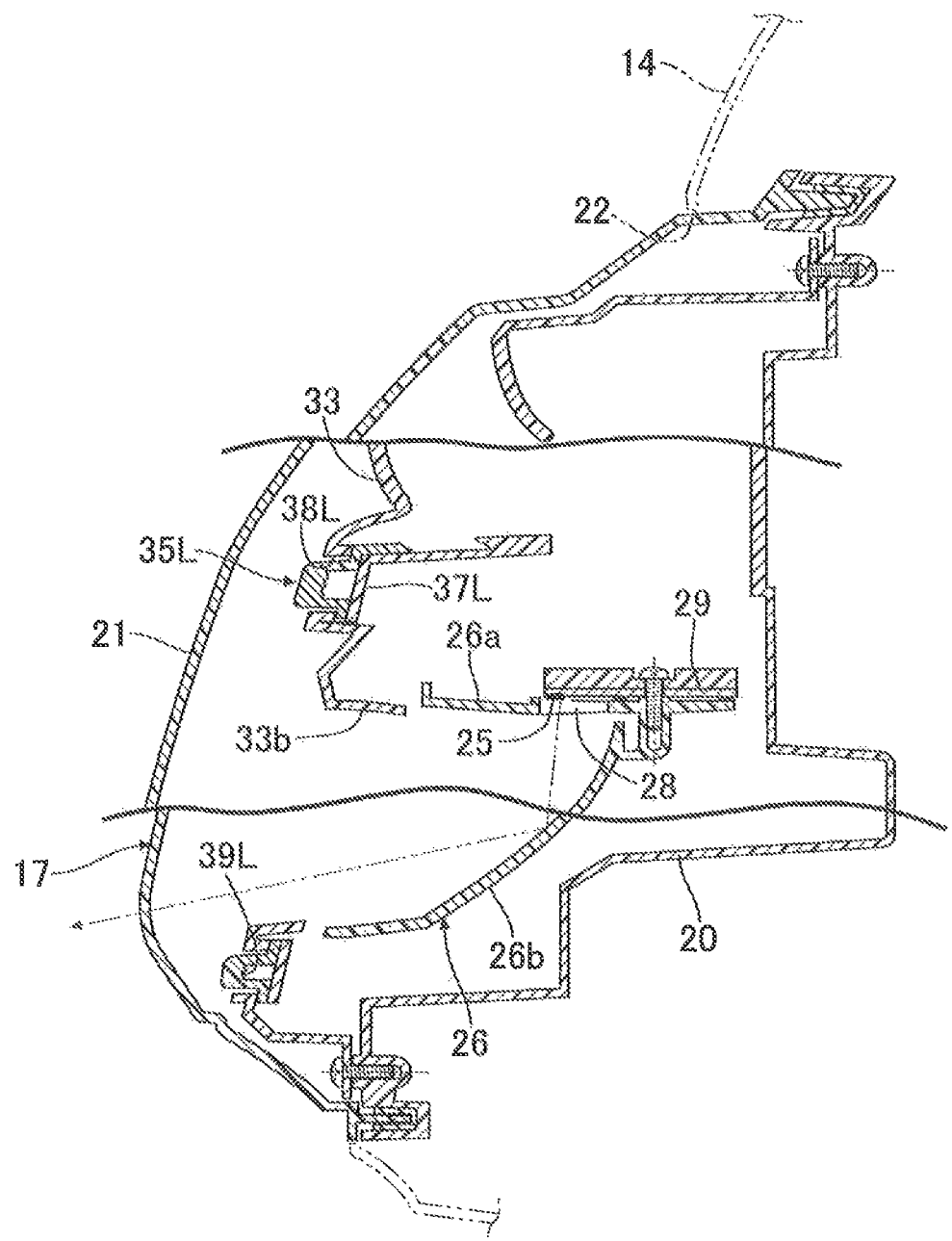
FIG. 5 is a sectional view along line 5-5 in FIG. 2. (first embodiment)

The high beam headlamp light sources 23 and the low beam headlamp light sources 25 are provided so as to be arranged side by side on a straight line on a common board 29 secured to upper faces of the upper reflectors 24a, 26a of the high beam headlamp reflector 24 and the low beam headlamp reflectors 26, and the lower reflectors 24b, 26b of the high beam headlamp reflector 24 and the low beam headlamp reflectors 26 have a substantially arc-shaped form, as shown in FIG. 4, so as to curve at two separate positions corresponding to the pairs of high beam headlamp light sources 23 and low beam headlamp light sources 25.

Figure 3:
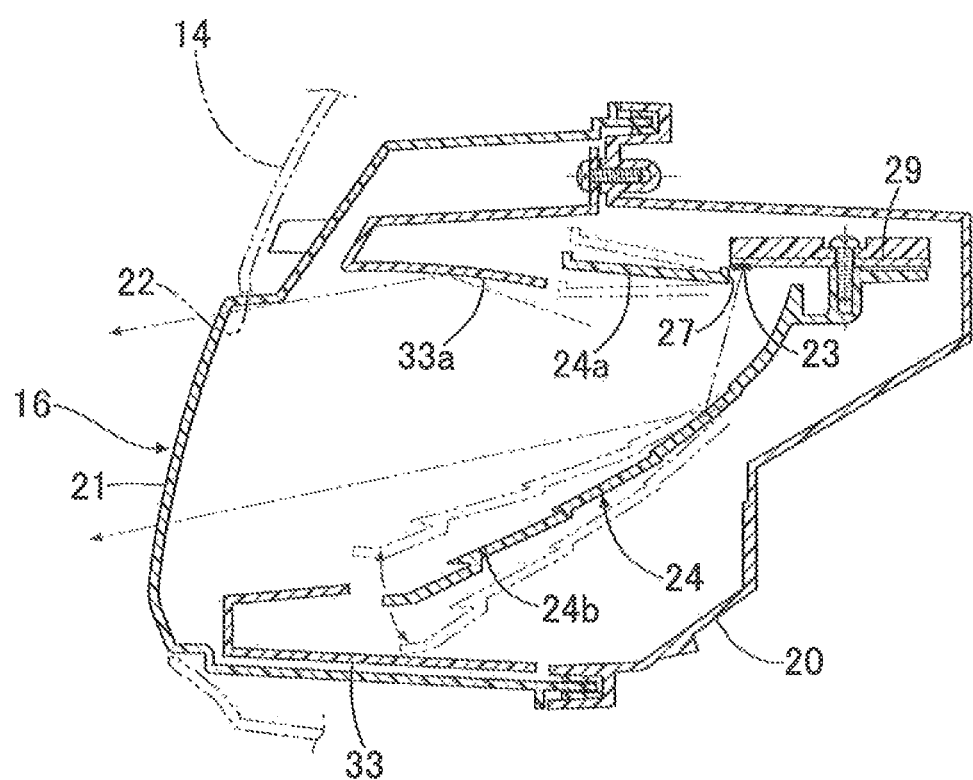
FIG. 3 is a sectional view along line 3-3 in FIG. 2. (first embodiment)

The high beam headlamp reflector 24 and the low beam headlamp reflectors 26 are supported on the housing 20 so that the optical axes of the high beam headlamp 16 and the low beam headlamps 17 can be changed vertically as shown by the chain line in FIG. 3. In this embodiment, as shown in FIG. 4, spherical portions 30a and 30a at extremities of a pair of left and right support legs 30 and 30 fixed to the low beam headlamp reflectors 26 and 26 on the left and right sides, which are integral with the high beam headlamp reflector 24, are swivelably fitted into receiving members 31 and 31 secured to the housing 20.

A cover member 33 disposed in front of the high beam headlamp reflector 24 and the low beam headlamp reflectors 26 is secured to the housing 20, this cover member 33 has reflection portions 33a and 33b for each of the high beam headlamp reflector 24 and the low beam headlamp reflectors 26, the reflection portions 33a and 33b making part of the light reflected from the lower reflectors 24b, 26b of the high beam headlamp reflector 24 and the low beam headlamp reflectors 26 shine forward of the vehicle, and these reflection portions 33a and 33b are formed into an arc shape protruding slightly upward so as to make light reflected from the lower reflectors 24b, 26b shine forward.

Figure 6:
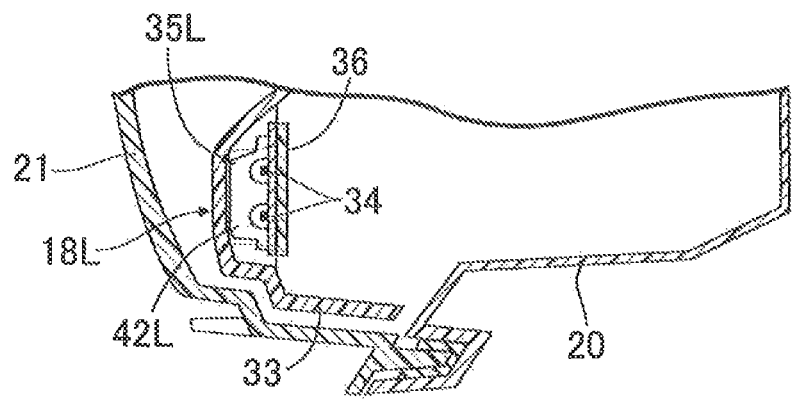
FIG. 6 is a sectional view along line 6-6 in FIG. 2. (first embodiment)

In FIG. 6, the left position lamp 18L includes the housing 20, the lens 21, position lamp light sources 34 and 34 that are a pair of LEDs disposed above and on the outside in the left-and-right direction of the low beam headlamp 17, and a light guide member 35L that guides light from the position lamp light sources 34 and 34 and makes it shine forward, the pair of position lamp light sources 34 and 34 being provided in common on a board 36 mounted on the cover member 33.

The right position lamp 18R includes the housing 20, the lens 21, position lamp light sources 34 and 34 that are a pair of LEDs disposed above and on the outside in the left-and-right direction of the low beam headlamp 17, and a light guide member 35R that guides light from the position lamp light sources 34 and 34 and makes it shine forward.

Light-shielding members 37L and 37R that block light from the light guide members 35L and 35R are disposed to the rear of the light guide members 35L and 35R, and the light guide members 35L and 35R are secured to the cover member 33 together with the light-shielding members 37L and 37R so as to make part of the light guide members 35L and 35R face slits 38L and 38R provided in the cover member 33. Moreover, the light guide members 35L and 35R are formed so as to guide light while diffusely reflecting it forward by means of concave-convex parts 39L and 39R formed on rear faces thereof.

The light guide members 35L and 35R are extendingly disposed so as to surround a lateral end, excluding a section adjacent to the high beam headlamp reflector 24, of the low beam headlamp reflectors 26 and 26 while not surrounding a lateral end of the high beam headlamp reflector 24, and part thereof is formed so as to follow the low beam headlamp reflectors 26 and 26.

That is, the light guide members 35L and 35R, while having linear parts 40L and 40R that extend obliquely upward and toward the outside in the vehicle width direction above the left and right low beam headlamp reflectors 26 and 26 and curved parts 41L and 41R that extend downward from the upper ends of the linear parts 40L and 40R and have lower parts formed so as to follow the outside of the low beam headlamp reflectors 26 and 26, are formed so that sections where the linear parts 40L and 40R and the curved parts 41L and 41R are connected form sharp corner parts 42L and 42R that point upward and outward in the vehicle width direction.

In this embodiment, the light guide member 35L of the left position lamp 18L is formed into a substantially 'angular U' shape opening on the left low beam headlamp reflector 26 side while having the linear part 40L extending upward to the left above the left low beam headlamp reflector 26 and the curved part 41L formed so as to extend downward from the upper end of the linear part 40L and have its lower part following the side of the left low beam headlamp reflector 26, part of the cover member 33 being disposed between the light guide member 35L and the left low beam headlamp reflector 26. On the other hand, the light guide member 35R of the right position lamp 18R is formed into a substantially 'angular U' shape opening on the right low beam headlamp reflector 26 side while having the linear part 40R extending upward to the right above the right low beam headlamp reflector 26 and the curved part 41R formed so as to extend downward from the upper end of the linear part 40R and have its lower part following the side of the right low beam headlamp reflector 26, part of the cover member 33 being disposed between the light guide member 35R and the right low beam headlamp reflector 26.

A section, where the linear part 40L and the curved part 41L are connected, of the light guide member 35L of the left position lamp 18L forms the sharp corner part 42L that is disposed above the left low beam headlamp reflector 26 and points upward to the left, and a section, where the linear part 40R and the curved part 41R are connected, of the light guide member 35R of the right position lamp 18R forms the sharp corner part 42R that is disposed above the right low beam headlamp reflector 26 and points upward to the right.

In the left and right position lamps 18L and 18R, the pairs of position lamp light sources 34 are disposed at positions where light is directed to the corner parts 42L and 42R of the light guide members 35L and 35R. Moreover, the light guide members 35L and 35R are formed so that the corner parts 42L and 42R are the rearmost parts, and the position lamp light sources 34 are disposed to the rear of the corner parts 42L and 42R. That is, the light guide members 35L and 35R are disposed in front of the position lamp light sources 34.

Figure 7:
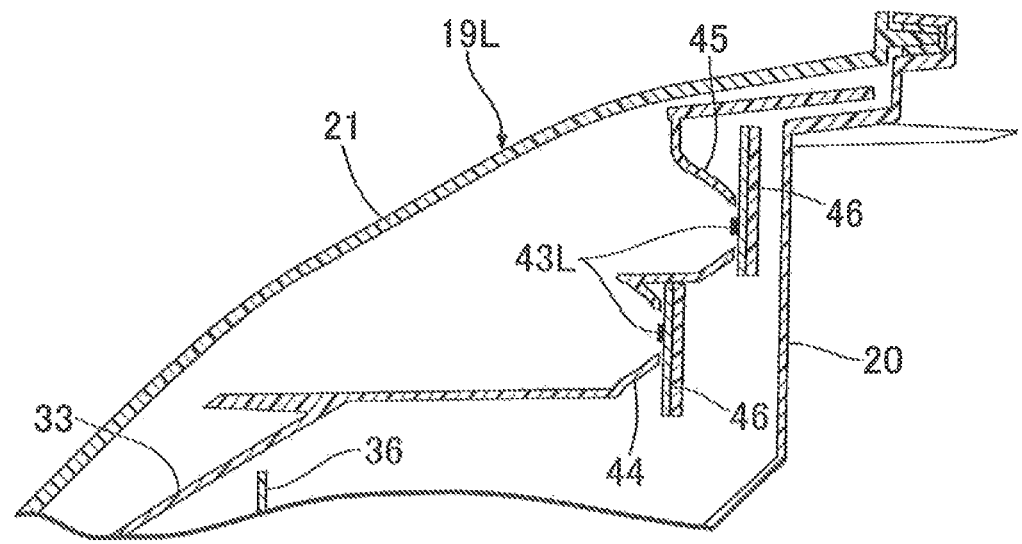
FIG. 7 is a sectional view along line 7-7 in FIG. 2. (first embodiment)

In FIG. 7, the direction indicators 19L and 19R each include the housing 20, the lens 21, direction indicator light sources 43L and 43L; 43R and 43R that are a pair of LEDs, and direction indicator reflectors 44, 45 separately corresponding to the direction indicator light sources 43L, 43R.

The pair of direction indicator light sources 43L and 43L possessed by the left direction indicator 19L are separately disposed on middle parts of the direction indicator reflectors 44 and 45, which are formed integrally with the cover member 33, and are separately provided on boards 46 and 46 fixed to the cover member 33. The right direction indicator 19R is also formed in the same manner as for the left direction indicator 19L.

The direction indicator light sources 43L, 43R are disposed on the outside in the left-and-right direction of the low beam headlamp light sources 25 and the light guide members 35L and 35R and above and on the outside in the left-and-right direction of the position lamp light sources 34, and are formed so that the light guide members 35L and 35R cross between the low beam headlamp light sources 25 and the left and right direction indicator light sources 43L, 43R. That is, the linear parts 40L and 40R of the light guide members 35L and 35R are disposed so as to pass between the low beam headlamp light sources 25 and the left and right direction indicator light sources 43L, 43R, and the left and right position lamp light sources 34 are disposed between the direction indicator light sources 43L, 43R and the low beam headlamp light sources 25 in the left-and-right direction.

The operation of this embodiment is now explained. Since the light guide members 35L and 35R, which guide light from the position lamp light sources 34 and make it shine forward, are extendingly disposed so as to surround the lateral end, excluding a section adjacent to the high beam headlamp reflector 24, of the low beam headlamp reflectors 26 and 26, the light of the low beam headlamps 17 and 17 and the light of the position lamps 18L and 18R are integrated and made to shine forward, thus enabling the visibility to be enhanced and also enabling an oncoming vehicle to recognize the outer frame part of the headlight 15, thereby enabling the conspicuousness to be enhanced.

Furthermore, the high beam headlamp reflector 24 and the low beam headlamp reflectors 26 are formed from the flat-shaped upper reflectors 24a, 26a and the lower reflectors 24b, 26b, which have a substantially arc-shaped form so as to reflect forward light from above, the upper reflectors 24a, 26a of the high beam headlamp reflector 24 and the low beam headlamp reflectors 26 are each provided with the through holes 27, 28, which make light from the high beam headlamp light sources 23 and the low beam headlamp light sources 25 disposed above the upper reflectors 24a, 26a shine toward the lower reflectors 24b, 26b of the high beam headlamp reflector 24 and the low beam headlamp reflectors 26, and it is therefore possible to compactly and effectively make even the light of an LED light source, which is highly directional, shine forward.

Furthermore, the light guide members 35L and 35R are formed so that the sections where the linear parts 40L and 40R and the curved parts 41L and 41R are connected are formed from the sharp corner parts 42L and 42R, which point upward and outward in the vehicle width direction while having the linear parts 40L and 40R extending obliquely upward and toward the outside in the vehicle width direction above the left and right low beam headlamp reflectors 26 and 26, and the curved parts 41L and 41R formed so as to extend downward from the upper ends of the linear parts 40L and 40R and have their lower parts follow the outside of the low beam headlamp reflectors 26 and 26, and due to such an arrangement of the corner parts 42L and 42R in the light guide members 35L and 35R it is possible to make the left and right low beam headlamps 17 and 17 stand out, thus contributing to improvement of the conspicuousness of the vehicle.

Moreover, since the pair of left and right direction indicator light sources 43L, 43R, which are disposed on the outside in the left-and-right direction of the pair of left and right low beam headlamp light sources 25 and the light guide members 35L and 35R, are disposed on the housing 20, it is possible to make the direction indicators 19L and 19R be easily distinguished from the low beam headlamps 17 and 17 and the position lamps 18L and 18R, thus enhancing the visibility of each of the lamps 19L, 19R, 17, 17, 18L, and 18R. Furthermore, the position lamps 18L and 18R emit light with a different color from that of the low beam headlamps 17 and 17 and the direction indicators 19L and 19R, thereby enabling the visibility to be further enhanced.

Moreover, since the light guide members 35L and 35R are formed so as to cross between the low beam headlamp light sources 25 and the direction indicator light sources 43L, 43R, it is possible to clearly divide the low beam headlamps 17 and 17 and the direction indicators 19L and 19R by means of the light guide members 35L and 35R, thus enabling a compact and highly visible headlight 15 to be formed.

Furthermore, since the cover member 33 having the reflection portions 33a and 33b, which make part of the light reflected by the high beam headlamp reflector 24 and the low beam headlamp reflectors 26 shine forward, are mounted on the housing 20 so as to be disposed in front of the high beam headlamp reflector 24 and the low beam headlamp reflectors 26, it is possible to make it shine forward efficiently, thus enhancing the visibility.

Moreover, since the light guide members 35L and 35R are disposed in front of the position lamp light sources 34, it is possible to set a relatively small distance between the left and right position lamp light sources 34, thus enabling the headlight 15 to be formed compactly in the left-and-right direction.

Furthermore, since parts of the light guide members 35L and 35R are formed so as to follow the low beam headlamp reflectors 26 and 26, it is possible to make the low beam headlamps 17 and 17 stand out by means of light from the light guide members 35L and 35R.

An embodiment of the present invention is explained above, but the present invention is not limited to the embodiment and may be modified in a variety of ways as long as the modifications do not depart from the spirit and scope thereof.

The invention claimed is:

1. A headlight for a two-wheeled motor vehicle in which disposed in a single housing supported on a front part of a vehicle body frame are a high beam headlamp light source, low beam headlamp light sources that are disposed on left and right of the high beam headlamp light source, a high beam headlamp reflector that reflects forward light from the high beam headlamp light source, low beam headlamp reflectors that are disposed on left and right sides of the high beam headlamp reflector so as to reflect forward light from the low beam headlamp light source and that are formed integrally with the high beam headlamp reflector, a position lamp light source, wherein a light guide member that guides light from the position lamp light source and makes the light shine forward is extendingly disposed so as to surround a lateral end, excluding a section adjacent to the high beam headlamp reflector, of each of the low beam headlamp reflectors, a pair of left and right direction indicator light sources are disposed in the housing on the outside in a left-and-right direction of the pair of left and right low beam headlamp light sources and the associated light guide members, respectively, and each light guide member is formed so as to cross between the low beam headlamp light source and the direction indicator light source.

2. The headlight for a two-wheeled motor vehicle according to claim 1, wherein the high beam headlamp reflector and the low beam headlamp reflector are each formed from a flat-shaped upper reflector and a lower reflector that has a substantially arc shaped form so as to reflect forward light from above, and the upper reflectors of the high beam headlamp reflector and the low beam headlamp reflector are provided with a through hole that makes light from the high beam headlamp light source and the low beam headlamp light source disposed above the upper reflectors shine toward the lower reflectors of the high beam headlamp reflector and the low beam headlamp reflector.

3. The headlight for a two-wheeled motor vehicle according to claim 2, wherein the light guide member, while having a linear part extending obliquely upward and toward the outside in a vehicle width direction above the left and right low beam headlamp reflectors and a curved part extending downward from an upper end of the linear part and having a lower part formed so as to follow the outside of the low beam headlamp reflector, is formed so that a section where the linear part and the curved part are connected is formed so as to form a sharp corner part that points upward and toward the outside in the vehicle width direction.

4. The headlight for a two-wheeled motor vehicle according to claim 2, wherein a cover member is disposed in front of the high beam headlamp reflector and the low beam headlamp reflector and is mounted on the housing, the cover member having a reflection portion that makes part of the light reflected from the high beam headlamp reflector and the low beam headlamp reflector shine forward of the vehicle.

5. The headlight for a two-wheeled motor vehicle according to claim 2, wherein the light guide member is disposed further forward than the position lamp light source.

6. The headlight for a two-wheeled motor vehicle according to claim 2, wherein part of the light guide member is formed so as to follow the low beam headlamp reflector.

7. The headlight for a two-wheeled motor vehicle according to claim 1, wherein the light guide member, while having a linear part extending obliquely upward and toward the outside in a vehicle width direction above the left and right low beam headlamp reflectors and a curved part extending downward from an upper end of the linear part and having a lower part formed so as to follow the outside of the low beam headlamp reflector, is formed so that a section where the linear part and the curved part are connected is formed so as to form a sharp corner part that points upward and toward the outside in the vehicle width direction.

8. The headlight for a two-wheeled motor vehicle according to claim 1, wherein a cover member is disposed in front of the high beam headlamp reflector and the low beam headlamp reflector and is mounted on the housing, the cover member having a reflection portion that makes part of the light reflected from the high beam headlamp reflector and the low beam headlamp reflector shine forward of the vehicle.

9. The headlight for a two-wheeled motor vehicle according to claim 1, wherein the light guide member is disposed further forward than the position lamp light source.

10. The headlight for a two-wheeled motor vehicle according to claim 1, wherein part of the light guide member is formed so as to follow the low beam headlamp reflector.

* * * * *